United States Patent
Waelde (10) Patent No.: US 11,415,450 B2
(45) Date of Patent: Aug. 16, 2022

(54) RADAR ANTENNA FOR A FILL LEVEL MEASUREMENT DEVICE

(71) Applicant: VEGA Grieshaber KG, Wolfach (DE)

(72) Inventor: Steffen Waelde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 180 days.

(21) Appl. No.: 16/019,099

(22) Filed: Jun. 26, 2018

(65) Prior Publication Data

US 2018/0372531 A1   Dec. 27, 2018

(30) Foreign Application Priority Data

Jun. 27, 2017   (EP) .................................. 17178080

(51) Int. Cl.
*G01F 23/284*   (2006.01)
*H01Q 13/02*   (2006.01)
(Continued)

(52) U.S. Cl.
CPC .............. *G01F 23/284* (2013.01); *G01S 7/03* (2013.01); *H01P 3/081* (2013.01); *H01P 5/028* (2013.01); *H01Q 1/225* (2013.01); *H01Q 13/02* (2013.01); *H01Q 15/08* (2013.01); *H01Q 19/08* (2013.01); *H01Q 21/064* (2013.01); *H01P 5/107* (2013.01); *H01Q 3/446* (2013.01); *H01Q 13/06* (2013.01); *H01Q 21/08* (2013.01)

(58) Field of Classification Search
CPC . G01S 7/03; H01P 3/081; H01P 5/028; H01P 5/107; H01Q 1/225; H01Q 13/02; H01Q 15/08; H01Q 19/08; H01Q 21/064; H01Q 3/446; H01Q 13/06; H01Q 21/08

USPC .......................................................... 342/124
See application file for complete search history.

(56) References Cited

U.S. PATENT DOCUMENTS 4,665,660 A * 5/1987 Jablonski .................. B24B 1/00
                                                       29/600
7,872,609 B2   1/2011 Ou et al.
(Continued)

FOREIGN PATENT DOCUMENTS

CN           1476652 A      2/2004
CN         206163718 U      5/2017
(Continued)

OTHER PUBLICATIONS

Chinese Office Action dated Aug. 26, 2020 in corresponding Chinese Patent Application No. 201810668230.3, 9 pages.
(Continued)

*Primary Examiner* — Olumide Ajibade Akonai
*Assistant Examiner* — Alexander L. Syrkin
(74) *Attorney, Agent, or Firm* — Oblon, McClelland, Maier & Neustadt, L.L.P.

(57) ABSTRACT

A radar antenna for a fill level measurement device is provided that includes at least one carrier plate and at least two antenna elements that are arranged on the carrier plate and are configured to transmit and/or to receive a radar signal, wherein each of the antenna elements includes a waveguide configured to direct the radar signal, wherein an interior volume of each waveguide is at least partially filled with a dielectric, the antenna elements being arranged at a distance from one another that is less than or equal to a wavelength of the radar signal.

15 Claims, 7 Drawing Sheets

(51) Int. Cl.
*H01Q 21/06* (2006.01)
*H01Q 15/08* (2006.01)
*G01S 7/03* (2006.01)
*H01P 3/08* (2006.01)
*H01P 5/02* (2006.01)
*H01Q 1/22* (2006.01)
*H01Q 19/08* (2006.01)
*H01Q 3/44* (2006.01)
*H01P 5/107* (2006.01)
*H01Q 13/06* (2006.01)
*H01Q 21/08* (2006.01)

(56) References Cited

U.S. PATENT DOCUMENTS

| | | | | |
|---|---|---|---|---|
| 9,318,811 | B1* | 4/2016 | Fluhler | H01Q 21/0006 |
| 9,389,113 | B2* | 7/2016 | Jirskog | G01F 23/284 |
| 10,168,197 | B2* | 1/2019 | Blodt | G01F 23/284 |
| 2003/0146867 | A1* | 8/2003 | Kornle | G01F 23/284 |
| | | | | 342/124 |
| 2006/0072875 | A1* | 4/2006 | Bhagavatula | G02B 6/29332 |
| | | | | 385/30 |
| 2006/0158382 | A1* | 7/2006 | Nagai | H01Q 21/0037 |
| | | | | 343/786 |
| 2008/0083281 | A1* | 4/2008 | Rolfes | G01F 23/284 |
| | | | | 73/627 |
| 2009/0153426 | A1* | 6/2009 | Worl | H01Q 21/064 |
| | | | | 343/776 |
| 2010/0141527 | A1* | 6/2010 | Lalezari | H01Q 21/24 |
| | | | | 342/368 |
| 2010/0328188 | A1* | 12/2010 | Chang | H01Q 5/42 |
| | | | | 343/893 |
| 2011/0080314 | A1* | 4/2011 | Wintermantel | G01S 13/343 |
| | | | | 342/147 |
| 2011/0094299 | A1* | 4/2011 | Muller | G01F 25/0061 |
| | | | | 73/290 V |
| 2015/0188236 | A1* | 7/2015 | Oppenlaender | H01Q 15/24 |
| | | | | 343/776 |
| 2018/0102584 | A1 | 4/2018 | Waelde et al. | |
| 2018/0106602 | A1 | 4/2018 | Welle et al. | |

FOREIGN PATENT DOCUMENTS

| | | | | |
|---|---|---|---|---|
| DE | 10 2007 003 388 A1 | | 8/2007 | |
| DE | 102012104090 A1 | * | 11/2013 | G01S 7/03 |
| EP | 2 916 389 A1 | | 9/2015 | |
| EP | 2916389 A1 | * | 9/2015 | H01Q 21/064 |
| EP | 3 309 523 A1 | | 4/2018 | |
| EP | 3 309 897 A1 | | 4/2018 | |
| WO | WO-2006061328 A1 | * | 6/2006 | H01Q 1/225 |
| WO | WO 2015/120883 A1 | | 8/2015 | |
| WO | WO 2015/134772 A1 | | 9/2015 | |

OTHER PUBLICATIONS

European Office Action dated May 15, 2020 in European Patent Application No. 17 178 080.2, 6 pages.

* cited by examiner

RADAR ANTENNA FOR A FILL LEVEL MEASUREMENT DEVICE

CROSS-REFERENCE TO RELATED APPLICATIONS

This application claims the benefit of the filing date of European Patent Application No. 17 178 080.2, filed on 27 Jun. 2017, the entire content of which is incorporated herein by reference, and which application claims benefit of the filing date of European Patent Application No. 16 193 550.7 filed on 12 Oct. 2016.

FIELD

The invention relates to the field of radar-based fill level measurement. The invention relates in particular to a radar antenna for a fill level measurement device, to a fill level measurement device comprising a radar antenna of this kind, and to a method for producing a radar antenna of this kind.

BACKGROUND

In particular in order to detect a surface topology of a filling material surface of bulk materials or moving liquids, for example, fill level measurement devices are often used that have radar antennas generally comprising a plurality of antenna elements for transmitting and/or receiving a radar signal.

In order to determine the surface topology, the surface of the filling material can be scanned by a measurement beam, for example. A radar antenna comprising a one-dimensional array, also referred to as a line scanner, consisting of a plurality of antenna elements can be used to control the measurement beam, the array allowing one-dimensional scanning of the filling material surface, based on a change in the main beam direction and/or the main receiving direction. Moreover, if this array is rotated about an axis, the surface can be scanned two-dimensionally.

Fill level measurement devices can also comprise a radar antenna in which antenna elements are arranged two-dimensionally, it being possible to measure the entire surface of the bulk material by means of electronic beam deflection, without the fill level measurement device being moved mechanically.

SUMMARY

An improved and compact radar antenna for a compact, robust, reliable and low-wear fill level measurement device is provided.

This is achieved by the subject matter of the independent claims. Further embodiments can be found in the dependent claims and the following description.

A described embodiment relates to a radar antenna for a fill level measurement device. The radar antenna can be advantageously used in particular for a fill level measurement device that detects a topology, for a fill level measurement device that determines a topology, and/or for a fill level measurement device for detecting a topology of a surface of a filling material, for example a bulk material and/or a liquid medium. For this purpose, the fill level measurement device can be adapted to operate according to the FMCW (frequency modulated continuous wave) method and/or according to the SFCW (stepped frequency continuous wave) method. The radar antenna comprises at least one carrier plate, for example a metal carrier plate, and at least two antenna elements that are arranged on the carrier plate and are configured for transmitting and/or receiving a radar signal. Each of the antenna elements comprises a waveguide for directing and/or conducting the radar signal, an interior volume of each waveguide being at least partially, in particular completely, filled with a dielectric, a dielectric material and/or a dielectric medium. The antenna elements are arranged at a distance from one another and/or are spaced apart from one another by a distance that is less than or equal to a wavelength of the radar signal. In this case, the distance between two antenna elements can be referred to as the distance between two directly adjacent antenna elements. The distance between two directly adjacent antenna elements can be measured as the distance between the centres and/or central axes of the relevant waveguides.

The radar antenna can have any desired number of antenna elements. In general, the antenna elements may be referred to as transceiver elements, which can be adapted and/or designed to both transmit and receive a radar signal. Alternatively, it is also possible for some of the antenna elements, acting as transmitting elements, to be adapted and/or designed to transmit a radar signal and for some of the antenna elements, acting as receiving elements, to be adapted and/or designed to receive a signal reflected from the surface of a filling material and/or a received signal.

Owing to the design according to a described embodiment of the radar antenna and of the antenna elements that are at least partially filled with a dielectric, a cross section, inner cross section, inner circumference and/or inner diameter of the waveguides can advantageously be reduced, such that a compact and robust radar antenna can overall be provided.

The antenna elements can be arranged in particular at a distance from one another that is less than or equal to one half of the wavelength of the radar signal. Side lobes and/or grating lobes can therefore be prevented.

In general, the radar antenna can be designed for a V-band fill level measurement device, an E-band fill level measurement device, a W-band fill level measurement device, an F-band fill level measurement device, a D-band fill level measurement device, a G-band fill level measurement device, a Y-band fill level measurement device, and/or a J-band fill level measurement device. In turn, the fill level measurement device can be designed as a V-band fill level measurement device, an E-band fill level measurement device, a W-band fill level measurement device, an F-band fill level measurement device, a D-band fill level measurement device, a G-band fill level measurement device, a Y-band fill level measurement device, and/or a J-band fill level measurement device. In other words, a frequency of the radar signal can be between 60 GHz and 75 GHz (V-band), between 60 GHz and 90 GHz (E-band), between 75 GHz and 110 GHz (W-band), between 90 GHz and 140 GHz (F-band), between 110 GHz and 170 GHz (D-band), between 140 GHz and 220 GHz (G-band), between 170 GHz and 260 GHz (Y-band), and/or between 220 GHz and 320 GHz (J-band).

The described embodiments of the invention can be considered in particular to be based on the insights described in the following. In order, inter alia, to suppress grating lobes, it may be advantageous for the antenna elements to be arranged at a distance of less than or equal to the wavelength of the radar signal, in particular less than or equal to one half of said wavelength. In a fill level measurement device operating, by way of example, in a frequency range of between 76 GHz and 81 GHz, one half of the wavelength is approximately 1.85 mm. This value corresponds to the highest frequency, 81 GHz, occurring in the radar signal.

Each waveguide has a particular cut-off frequency for electromagnetic waves, it not being possible for electromagnetic waves having a lower frequency to be directed in the waveguide. The cut-off frequency is dependent on the dimensions of the waveguide, for example on an inner diameter in the case of a circular waveguide or on the inner edge lengths in the case of a rectangular waveguide. In other words, the cut-off frequency is proportional to the dimensions of the waveguide, e.g., proportional to the inner diameter of a circular waveguide. This may result in it not being possible for waveguides that are filled with air to be placed and/or arranged at a distance of less than or equal to one half of the wavelength of the radar signal, owing to their minimum dimensions, for example the minimum inner diameter, which are determined by the cut-off frequency. By contrast, if the waveguides are filled with a dielectric, as is the case according to the described embodiments according to the invention, the cut-off frequency and thus the minimum dimensions of the waveguide are reduced, and therefore the waveguides can be advantageously arranged at a distance of less than or equal to one half of the wavelength of the radar signal.

The radar antenna and/or the fill level measurement device and the working frequency range thereof can be advantageously designed such that only the fundamental mode of the radar signal is able to propagate in the waveguides.

According to one embodiment, the waveguides of the antenna elements are oriented on the carrier plate such that the electric field vectors of the fundamental modes of the waveguides are oriented such that they are parallel or antiparallel to one another. Alternatively or in addition, the antenna elements have identical or antiparallel polarisation directions. In this case, the polarisation can be linear, circular or elliptical. For example, the waveguides can be arranged on the carrier plate in an identical orientation.

According to one embodiment, each of the antenna elements comprises a radiator element for coupling the radar signal into the waveguide and/or for decoupling the radar signal from the waveguide, each of the radiator elements being arranged at least in part in the interior volume of the associated waveguide and/or so as to adjoin a first end of said associated waveguide, and the radiator elements being designed and oriented relative to one another such that the radar signals coupled into the waveguides have electric field vectors that are parallel to one another. The waveguides can therefore have identical polarisation directions by the radar signal being fed into the waveguides in an identical manner and/or the radar signal being fed into said waveguides in an identical direction, for example by means of the radiator elements, a radar front end and/or a radar module of the fill level measurement device. For this purpose, the radiator elements can be identical to one another and/or can be arranged and/or oriented on the carrier plate in an identical manner.

The electric field vectors of the fundamental modes of the waveguides can, in general, be dependent on the geometry of the waveguide and/or on a feed direction of the radiator elements. For example, the fundamental mode in a rectangular waveguide can only propagate in the waveguide at low attenuation when the electric field vector is oriented in parallel with the long side of the rectangular waveguide. Otherwise, the fundamental mode is attenuated to a high degree. In the case of a circular waveguide, however, this condition is omitted owing to the symmetry of the circular waveguide about the central axis thereof. In this case, however, it is possible to ensure that the polarisations of the antenna elements and/or the waveguides are identical to one another by the radar signal being fed in, by means of the radiator elements, in an identical manner and in an identical feed direction. For this purpose, the radiator elements can be identical to one another and/or can be arranged and/or oriented on the carrier plate in an identical manner. The polarisation directions of the antenna elements can also be rotated relative to one another by 180° and/or be oriented such that they are antiparallel to one another. In particular, the polarisation directions of the transmitting elements can be oriented such that they are antiparallel to the polarisation directions of the receiving elements. If there were to be other angles between the polarisation directions of the transmitting elements and those of the receiving elements, the reflected signal and/or the received signal would only arrive at a receiver circuit of the fill level measurement device, for example, in an attenuated state.

According to one embodiment, the dielectric has a relative permittivity of at least 1.5, in particular at least 1.9. Alternatively or in addition, the dielectric comprises a synthetic fluoropolymer of tetrafluoroethylene, i.e., TEFLON®, a plastics material, and/or polyether ether ketone (PEEK). The dielectric can be in particular in the form of a solid. Owing to the relative permittivity of at least 1.5, the cut-off frequency and thus the minimum dimension of the waveguide can be advantageously reduced, and therefore the waveguides can be arranged more closely to one another at a distance of less than or equal to the wavelength of the radar signal, in particular less than or equal to one half of said wavelength.

According to one embodiment, the waveguides are each formed as a recess in the carrier plate or are arranged on an outer surface of the carrier plate. The two alternatives can be produced cost-effectively and such that they have a compact design.

According to one embodiment, each of the antenna elements comprises a lens which is arranged on an antenna-side end of the associated waveguide. The lenses can each be formed in one piece with the dielectric. The antenna-side end may denote the end of the waveguides that is in the emission direction of the radar signal and/or via which the radar signal is emitted. The lenses make it possible to advantageously improve adaptation and/or coupling of the waveguides to the free space.

According to one embodiment, each of the waveguides is tapered at an antenna-side end so that an aperture in the antenna elements is enlarged. An extension of a horn radiator can therefore be formed, and this can increase the antenna gain of the single antenna element and/or of an individual antenna element.

According to one embodiment, each of the waveguides has a circular, oval, elliptical, rectangular, square or polygonal cross section.

According to one embodiment, each of the waveguides has a circular cross section, each of the antenna elements being designed to transmit and/or receive a radar signal having a frequency of at least 75 GHz, and each of the waveguides having an inner diameter of less than 2.4 mm, in particular less than 2.34 mm.

According to one embodiment, the radar antenna comprises at least one dummy antenna element which is arranged on the carrier plate and is configured for influencing a directional characteristic of at least one of the antenna elements, the dummy antenna element comprising a dummy waveguide which is terminated with a terminating wave impedance, short-circuited or left open-circuit, such that a radar signal cannot be emitted and/or received by the dummy antenna element. In this case, the dummy antenna element can be designed in a similar and/or identical manner to the remaining antenna elements, but is not, for example, connected to a radar module and/or a radar front end and/or is not coupled to a radiator element.

The geometry, structure, material, size and/or shape of the at least one dummy antenna element can be such that it corresponds to the geometry, structure, material, size and/or shape of the antenna elements. The geometry, structure, material, size and/or shape of the dummy antenna element can be adapted to the geometry, structure, material, size and/or shape of the antenna elements. In particular, the antenna elements and the dummy antenna element can have a similar and/or substantially identical geometry, size, structure and/or shape. Alternatively or in addition, the antenna elements and the dummy antenna element can be made from a similar and/or substantially identical material. The directional characteristics of the antenna elements can therefore be advantageously adapted and/or matched to one another. The dummy antenna element can be arranged on the carrier plate so as to be next to and/or adjoining at least one of the antenna elements.

For example, the antenna elements can be in the form of dielectric conductors and/or coaxial conductors, it being possible for the dummy antenna element to be structurally adapted to the respective antenna element types. The antenna elements can also comprise, for example, a cable for conducting the radar signal, it being possible for the dummy antenna element to comprise, for example, a cable and/or a plastics tube in order to be structurally adapted to the antenna elements.

In general, the dummy antenna element can differ from the antenna elements in that a radar signal cannot be emitted and/or transmitted by the dummy antenna element, and in that a signal reflected from the filling material, which signal is also referred to as the received signal, cannot be received by the dummy antenna element. For this purpose, the dummy antenna element cannot, for example, be connected to a radar module and/or a radar front end of the fill level measurement device and cannot have a corresponding design.

According to one embodiment, each of the antenna elements comprises a waveguide for directing the radar signal. Furthermore, the dummy antenna element comprises a dummy waveguide which is substantially identical and/or similar to the waveguides of the antenna elements. The geometry, structure, material, size and/or shape of the waveguides and the geometry, structure, material, size and/or shape of the dummy waveguide can be adapted to one another, and/or are such that they correspond to one another. In particular, the waveguides and the dummy waveguide can have an identical geometry, size, shape and/or structure. The waveguides and the dummy waveguide can also be made from a similar and/or the same material. The directional characteristics of the antenna elements can therefore be advantageously influenced, matched to one another and/or adapted to one another.

The antenna elements can each comprise a radiator element for coupling and/or decoupling a radar signal into or from the waveguides. So that the dummy antenna element cannot transmit and/or receive a radar signal, it is possible for the dummy antenna element to not have a radiator element of this kind and/or for the dummy waveguide not to be coupled to a radiator element.

For improved side lobe attenuation in the signal processing, for example by means of a control device of the fill level measurement device, it can be advantageous for the directional characteristic of an individual antenna element to not significantly differ from the directional characteristics of the other antenna elements. In order to positively influence the directional characteristic of the individual antenna element, one or more dummy antenna elements can be provided that may have the same or similar design to the antenna elements. Unlike the antenna elements, however, the dummy antenna elements cannot be connected to a receiver and/or transmitter, but are instead terminated with a terminating wave impedance, short-circuited or left open-circuit. The dummy antenna elements can be arranged next to the antenna elements such that the directional characteristics of adjacent antenna elements are matched to one another. In this case, the antenna elements and the dummy antenna elements of the radar antenna can be arranged at a distance from one another that is less than or equal to the wavelength, in particular less than or equal to one half of the wavelength.

A second aspect of the described embodiments relates to a fill level measurement device for determining a fill level of a medium. The fill level measurement device can be designed in particular as a fill level measurement device that detects a topology and/or a fill level measurement device for detecting a topology of a surface of a filling material, for example a bulk material and/or a liquid, for example in a container or on a bulk material stock pile. The fill level measurement device comprises at least one radar antenna, as described above and in the following.

Features and elements of the radar antenna, as described above and in the following, can be features and elements of the fill level measurement device, as described above and in the following. By the same token, features and elements of the fill level measurement device, as described above and in the following, can be features and elements of the radar antenna, as described above and in the following.

According to one embodiment, the radar antenna comprises a plurality of antenna elements that are designed as transmitting elements, are configured for transmitting the radar signal, and are arranged on the carrier plate in a first row. Furthermore, the radar antenna comprises a plurality of antenna elements that are designed as receiving elements, are configured for receiving a reflected signal, and are arranged on the carrier plate in a second row transversely to the first row. For example, the transmitting elements and the receiving elements of the radar antenna can be arranged on the carrier plate in the shape of a T. In other words, the transmitting elements and/or the receiving elements can be distributed and/or arranged on the carrier plate with a T-shaped geometry. For example, the horizontal leg of the T-shape may only comprise transmitting elements and the vertical leg may only comprise receiving elements, or vice versa. In general, on the carrier plate, the transmitting elements can be arranged in a first row and the receiving elements can be arranged in a second row. In this case, the first row can run transversely to the second row and/or can extend transversely to the second rows and/or can be arranged transversely to the second row. In particular, the first row can extend substantially orthogonally to the second row and thereby form the T-shape. By suitable multiplexing, in particular time-division multiplexing, of the transmitting elements and/or receiving elements and by suitable evaluation of the reflected signals or received signals received by each receiving element, a collection of echo curves can be identified in this manner that may correspond to a rectangular arrangement of a virtual array. Furthermore, the number of transmitting elements and/or receiving elements and thus the production costs of the fill level measurement device can therefore advantageously be reduced.

A third aspect of the described embodiments relates to a method for producing a radar antenna. The method comprises the following steps:

arranging at least two antenna elements for transmitting and/or receiving a radar signal on a carrier plate of the radar antenna, each of the antenna elements comprising a waveguide for directing the radar signal; and at least partially filling an interior volume of each waveguide with a dielectric, the antenna elements being arranged at a distance from one another that is less than or equal to a wavelength of the radar signal, in particular less than or equal to one half of said wavelength.

Features and elements of the radar antenna and/or of the fill level measurement device, as described above and in the following, can be features, elements and/or steps of the method, as described above and in the following. By the same token, features, elements and/or steps of the method, as described above and in the following, can be features and elements of the radar antenna and/or of the fill level measurement device, as described above and in the following.

BRIEF DESCRIPTION OF THE DRAWINGS

In the following, embodiments are described in detail with reference to the accompanying drawings. In the following drawings, like reference signs denote like or similar elements. The views in the drawings are schematic and not to scale.

DETAILED DESCRIPTION OF EMBODIMENTS

Figure 1:
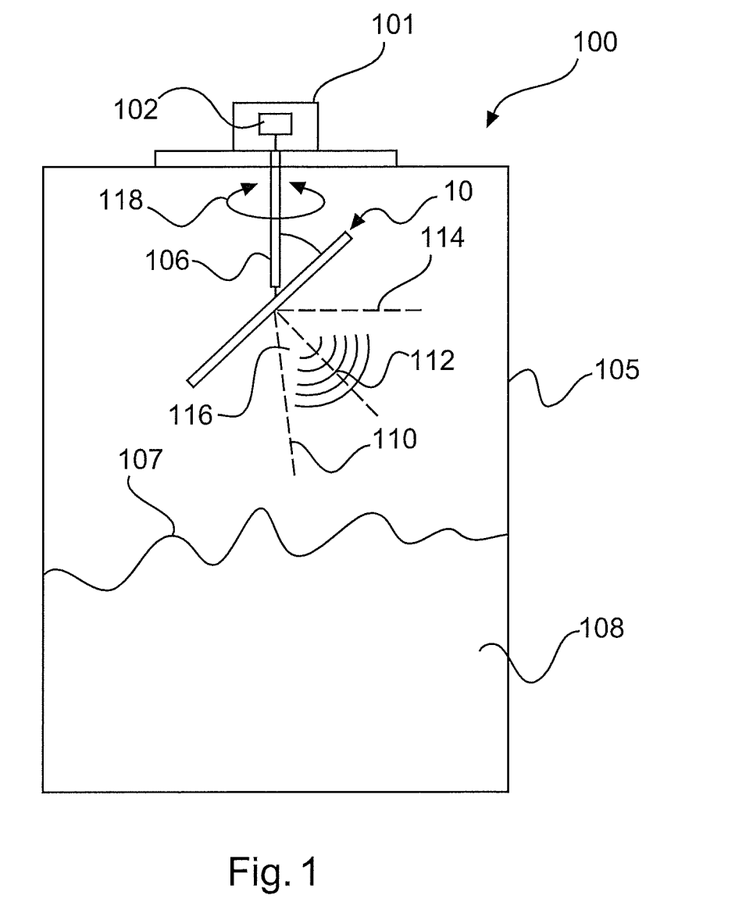
FIG. 1 shows a fill level measurement device that detects a topology, according to one embodiment.

FIG. 1 shows a fill level measurement device 100 that detects a topology, also referred to as a fill level measurement device 100 that determines a topology, according to one embodiment. The fill level measurement device 100 comprises a control unit 101 that has an electric control circuit 102, and a radar antenna 10. The fill level measurement device from FIG. 1 is in the form of what is referred to as a rotating line scanner 100, the radar antenna 10 being connected and/or coupled to the control unit 101 by means of an antenna holder 106. Fill level measurement devices 100 of this kind are used in particular for measuring bulk material in a container 105 or on an open stockpile, it being possible to determine the progression of the surface 107 of the bulk material 108 and/or the topology of the filling material surface 107 of the filling material 108.

The radar antenna 10 can be equipped with one or more transmitting elements and/or receiving elements, and this makes it possible to change the main beam direction and/or the main receiving direction 110, 112, 114 by definable angles 116. Therefore, echo signals and/or echo curves can be detected from the different main beam directions and/or main receiving directions 110, 112, 114. By additionally rotating 118 the antenna holder 106, which can, so to speak, define an axis 106, every point on the filling material surface 107 of the filling material 108 can be measured. This combined apparatus for electronically and mechanically deflecting beams is advantageous in that, in the case of electronic beam deflection, only a maximum angle 116 of typically +−45° has to be set in order for it to be possible to measure the entire container 105 until said container has been completely filled.

However, owing to the mechanical components used, such as the rotatable antenna holder 106, the fill level measurement device 100 shown in FIG. 1 can be susceptible to wear and expensive.

Figure 2A:
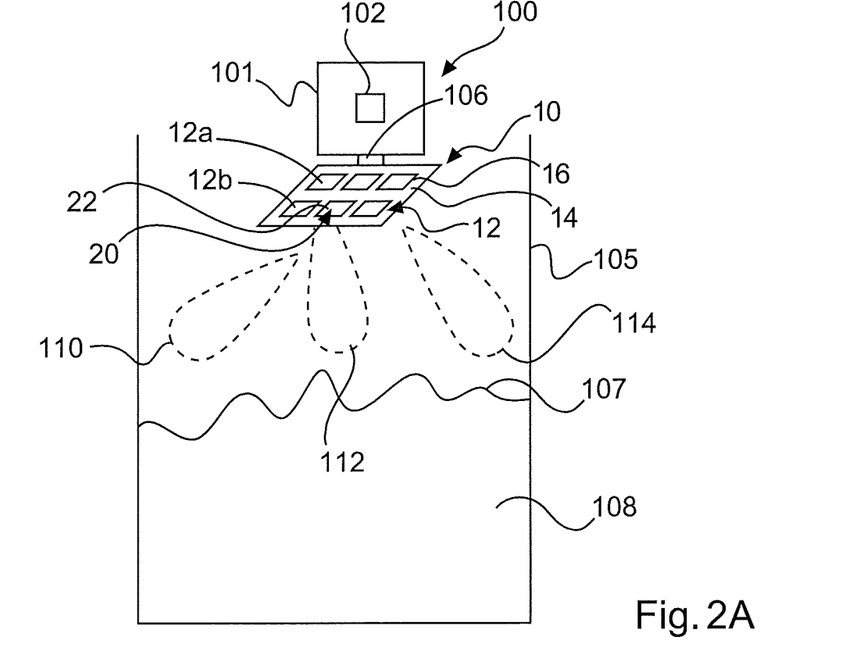
FIG. 2A shows a fill level measurement device that detects a topology, according to one embodiment.
Figure 2B:
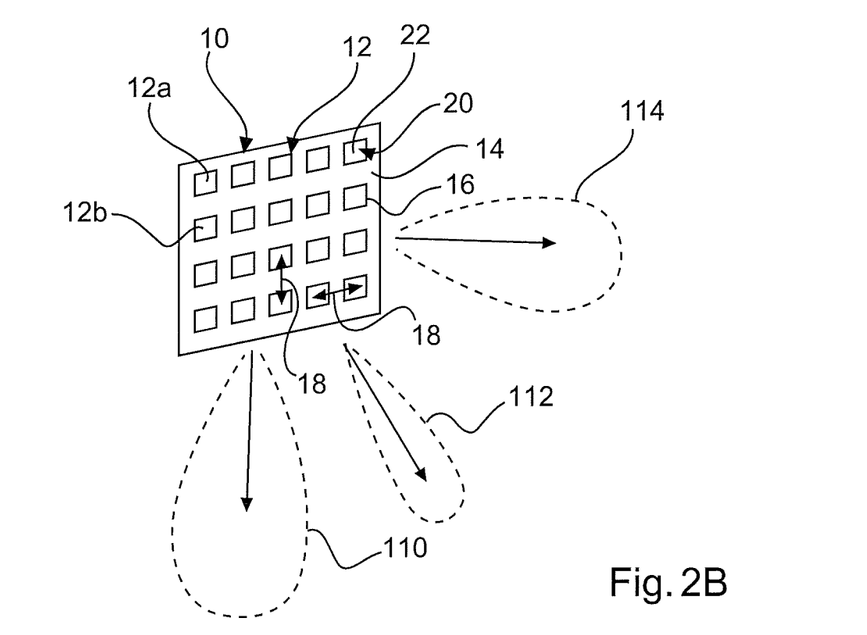
FIG. 2B shows a radar antenna of the fill level measurement device from FIG. 2A.

FIG. 2A shows a fill level measurement device 100 that detects a topology, according to one embodiment. FIG. 2B shows a radar antenna 10 of the fill level measurement device 100 from FIG. 2A. Unless indicated otherwise, the fill level measurement device 100 from FIG. 2A and/or the radar antenna 10 from FIG. 2B has the same features and elements as the fill level measurement device 100 from FIG. 1.

Unlike the fill level measurement device 100 from FIG. 1, the fill level measurement device 100 from FIGS. 2A and 2B comprises a radar antenna 10 that is mechanically and rigidly connected to the control unit 101 by a fastening means 106 and/or antenna holder 106. This construction means that wear of components of the fill level measurement device 100 can be effectively reduced.

The radar antenna 10 comprises two or more antenna elements 12 for transmitting a radar signal and/or for receiving a signal or received signal reflected from the surface 107. The antenna elements 12 can be referred to as transmitting elements 12a and/or receiving elements 12b. In general, some of the antenna elements 12 can be designed only to transmit a radar signal, i.e. designed as transmitting elements 12a, and some of the antenna elements 12 can be designed only to receive the reflected signal or received signal, i.e. designed as receiving elements 12b. Alternatively, all antenna elements 12 can be designed to transmit and receive, i.e. designed as both transmitting elements 12a and receiving elements 12b.

The antenna elements 12 are arranged on a carrier plate 14 of the radar antenna 10, for example on a metal carrier plate 14 thereof. In principle, the antenna elements 12 can be arranged on the carrier plate 14 in any arrangement, in particular in a two-dimensional arrangement, for example in one or more rows and/or columns.

Each antenna element 12 comprises a waveguide 16 for conducting and/or directing the radar signal, i.e. for directing a transmitted signal and/or a received signal. The waveguides 16 of the antenna elements 12 can be formed as recesses and/or openings in the carrier plate 14. Alternatively or in addition, the waveguides 16 can be attached and/or fastened to an outer surface of the carrier plate 14.

The waveguides 16 can have a circular, oval, elliptical, rectangular, square or polygonal cross section. The waveguides 16 can each have an identical cross section.

Antenna elements 12 and/or waveguides 16 that are directly adjacent in each case are arranged on the carrier plate 14 at a distance 18 from one another that is less than or equal to a wavelength of the radar signal. In this case, both the antenna elements 12 and/or waveguides 16 that are directly adjacent in the vertical direction and those that are directly adjacent in the horizontal direction are arranged at this distance 18 from one another. In other words, each of the antenna elements 12 and/or waveguides 16 can be at a distance 18 from the surrounding and directly adjacent antenna elements 12 and/or waveguides 18 that is less than or equal to the wavelength. The distance 18 can be measured in each case between the centres and/or central axes of the directly adjacent waveguides 16. In particular, the distance 18 can be less than or equal to one half of the wavelength of the radar signal so as to prevent grating and/or side lobes.

So that the individual antenna elements 12 and/or waveguides 16 can be arranged on the carrier plate 14 at a distance 18 of less than or equal to the wavelength of the radar signal, in particular less than or equal to one half of the wavelength of the radar signal, an interior volume 20 of each waveguide 16 is at least partially, in particular completely, filled with a dielectric 22 and/or a dielectric material 22. As a result, a cut-off frequency of the antenna elements 12 and thus a minimum dimension of the waveguides 16 can advantageously be reduced, and therefore the antenna elements 12 and/or the waveguides can be arranged at the distance 18 from one another, as shown in detail in the following figures.

The fill level measurement device 100 can be designed and/or adapted to measure the filling material surface 107 on a beam deflection system by means of methods for analogue and/or digital beam deflection. In this case, the main beam direction and/or main receiving direction 110, 112, 114 can be changed electronically, i.e. without mechanically moving components of the fill level measurement device 100.

Figure 3:
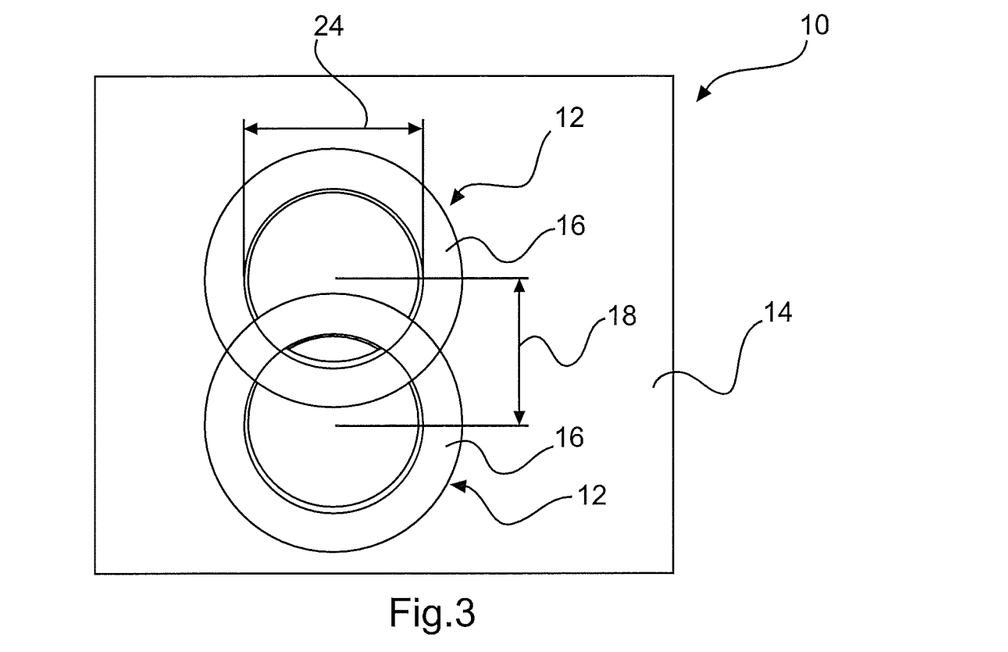
FIG. 3 shows a radar antenna according to one embodiment.

FIG. 3 shows a radar antenna 10 according to one embodiment. Unless indicated otherwise, the radar antenna 10 from FIG. 3 has the same features and elements as the radar antennas 10 from FIGS. 1 to 2B.

The radar antenna 10 shown in FIG. 3 comprises two antenna elements 12 each having a circular waveguide 16. The circular waveguides 16 are each filled with air, i.e. not with a dielectric 22.

If the radar antenna 10 is configured to be used for a W-band fill level measurement device 100 in which the transmission frequency of the radar signal is in a range of, for example, 76 GHz to 81 GHz, one half of the wavelength of the 81 GHz signal component is approximately 1.85 mm. Furthermore, a minimum diameter 24 at a cut-off frequency of approximately 75 GHz is approximately 2.34 mm. Therefore, air-filled antenna elements 12 of this kind cannot be arranged on the carrier plate 14 at a distance 18 of less than or equal to one half of the wavelength of approximately 1.84 mm, since the waveguides 16 would overlap in such an arrangement and would project into the interior volumes of adjacent waveguides, as shown in the figure. Therefore, the antenna elements 12 have to be arranged at a distance 18 from one another that is greater than one half of the wavelength, as a result of which grating and side lobes can rarely be prevented, which, in turn, can have negative effects on measurement accuracy.

Figure 4:
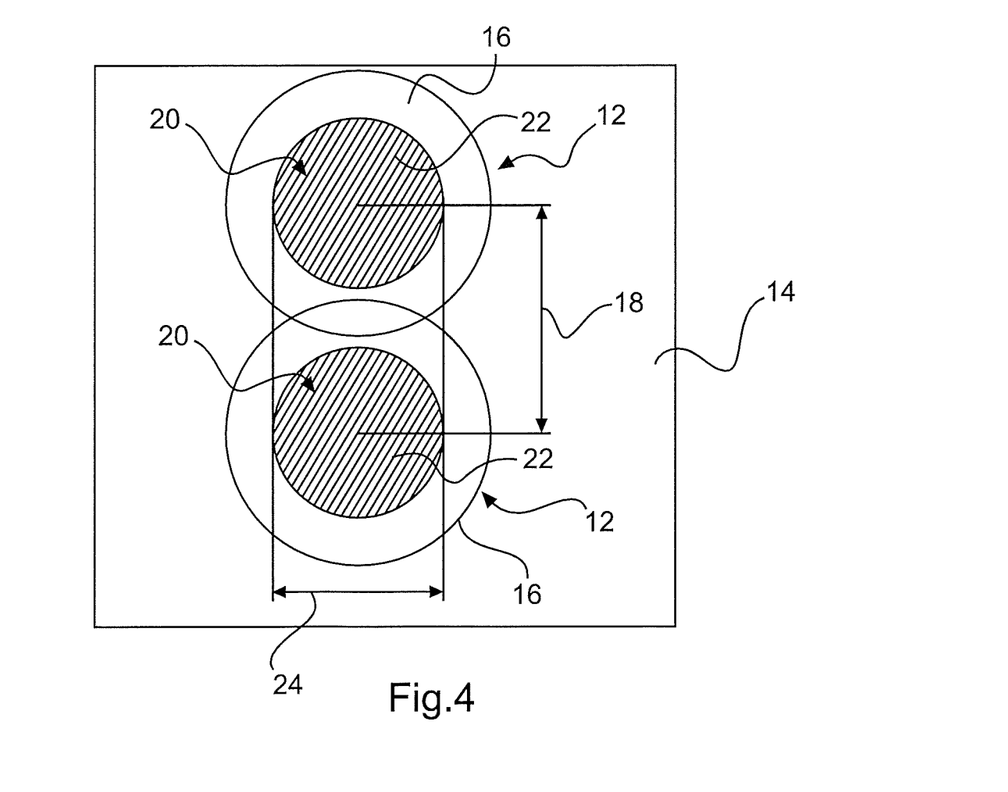
FIG. 4 shows a radar antenna according to one embodiment.

FIG. 4 shows a radar antenna 10 according to one embodiment. Unless indicated otherwise, the radar antenna 10 from FIG. 4 has the same features and elements as the radar antennas 10 from FIGS. 1 to 3.

In order to overcome the problem described with regard to FIG. 3, according to the described embodiment, each antenna element 12 and/or each waveguide 16 is at least partially, in particular completely, filled with a dielectric 22. In other words, the interior volume 20 of each waveguide 16 is filled with a dielectric 22. Filling the waveguides 16 with a dielectric means that the cut-off frequency is reduced, and therefore the waveguides 16 can each be designed having a smaller minimum dimension 24 and/or a smaller minimum diameter 24. As a result, the distance 18 between the individual antenna elements 12 and/or waveguides 16 can be reduced to a value of less than or equal to one half of the wavelength.

By way of example, the dielectric 22 can have a relative permittivity of at least 1.5, in particular at least 1.9. In particular, the dielectric 22 can comprise TEFLON®, a plastics material and/or PEEK. PEEK has a relative permittivity of between 3.1 and 3.8. If the radar antenna 10 is used for a W-band fill level measurement device 100 in which the transmission frequency of the radar signal is in a range of, for example, 76 GHz to 81 GHz, one half of the wavelength of the 81 GHz signal component is approximately 1.85 mm. Furthermore, depending on the relative permittivity value, the minimum diameter 24 of the waveguides 16 filled with a dielectric 22 at a cut-off frequency of approximately 75 GHz is less than 1.8 mm, in particular less than 1.6 mm, and preferably approximately 1.4 mm. Owing to the reduced minimum diameter 24, the waveguides 16 can therefore be arranged at a distance from one another of less than or equal to one half of the wavelength.

Figure 5A:
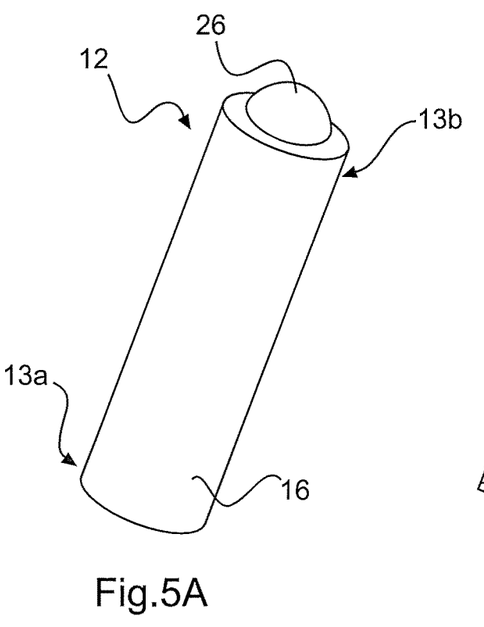
FIG. 5A shows an antenna element for a radar antenna according to one embodiment.
Figure 5B:
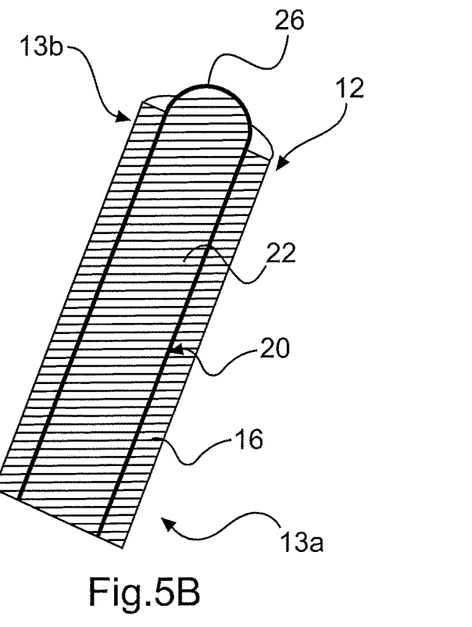
FIG. 5B is a longitudinal section through the antenna element from FIG. 5A.

FIG. 5A shows an antenna element 12 for a radar antenna 10 according to one embodiment. FIG. 5B is a longitudinal section through the antenna element 12 from FIG. 5A. Unless indicated otherwise, the antenna element 12 from FIGS. 5A and 5B has the same elements and features as the antenna elements 12 depicted in the previous figures.

The antenna element 12 from FIGS. 5A and 5B comprises a circular waveguide 16, the interior volume 20 of which is at least partially, in particular completely, filled with a dielectric 22. In principle, the waveguide 16 can have any other cross section, for example an elliptical, oval, rectangular, square or polygonal cross section.

Furthermore, the antenna element 12 and/or the circular waveguide 16 comprises a first end 13a for arranging and/or fastening the antenna element 12 on the carrier plate 14 of the radar antennas 10. Moreover, the antenna element 12 and/or the circular waveguide 16 comprises a second end 13b that is opposite the first end 13a in the longitudinal extension direction of the circular waveguide 16. The second end 13b is referred to as an antenna-side end 13b of the antenna element 12, which end is oriented and/or aligned in an emission direction of the antenna element 12. The second end 13b is thus designed to emit the radar signal and/or receive the received signal. If the waveguide 16 is in the form of a recess and/or opening in the carrier plate 14, the second end 13b can denote a waveguide opening 13b in an antenna-side outer surface of the carrier plate 14 that faces the filling material 108.

On the second end 13b of the antenna element 12, the antenna element 12 comprises a lens 26 which projects at least in part from the second end 13b of the antenna element 12. In this case, the lens 26 is semi-spherical, but the lens 26 may have any other geometry. In particular, the geometry and/or shape of the lens 26 can be adapted to the shape of a cross-sectional surface of the waveguide 16. The lens 26 makes it possible for the waveguide 16 to be better adapted to a free space.

The lens 26 can be formed from a dielectric and/or a dielectric material. In particular, the lens 26 can be formed from the same dielectric 22 with which the interior volume 20 of the waveguide 16 is filled. The relative permittivity of the lens 26 or the material of the lens 26 can be at least 1.5, and in particular at least 1.9. For example, the lens 26 can be forming from plastics material, TEFLON® and/or PEEK.

The lens 26 and the dielectric 22 in the interior volume 20 of the waveguide 16 can be formed in two pieces or in one piece.

Figure 6:
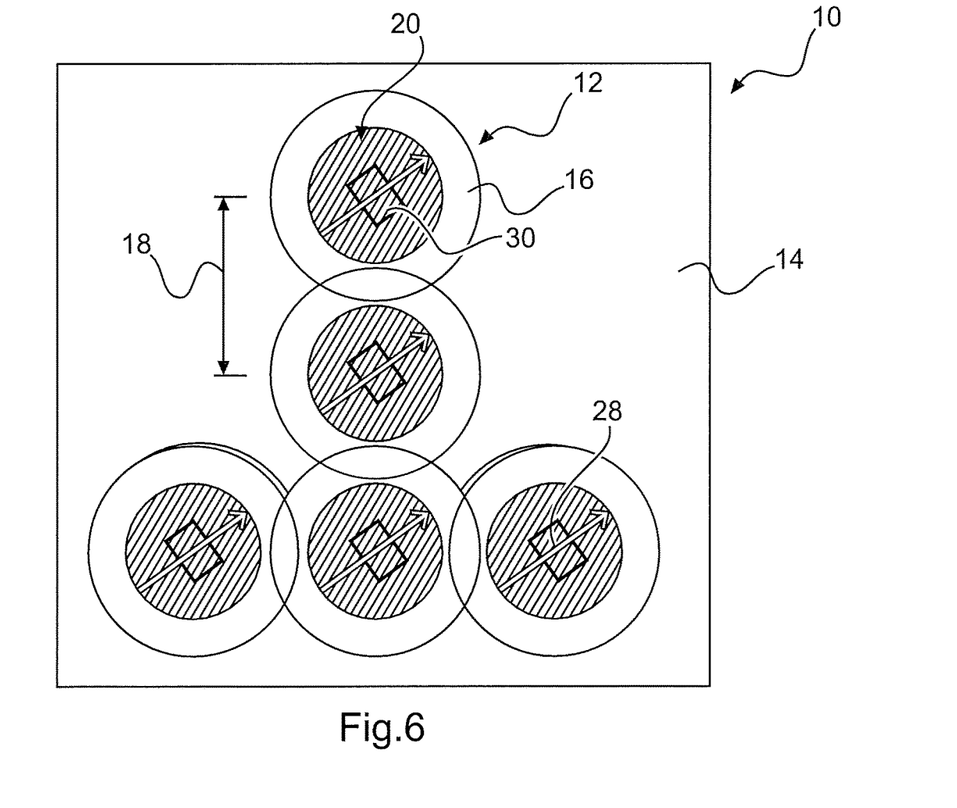
FIG. 6 shows a radar antenna according to one embodiment.

FIG. 6 shows a radar antenna 10 according to one embodiment. Unless indicated otherwise, the radar antenna 10 from FIG. 6 has the same elements and features as the radar antennas 10 from the previous figures.

The radar antenna 10 from FIG. 6 has a plurality of antenna elements 12 each comprising a circular waveguide 16. The interior volume 20 of each waveguide 16 is filled with a dielectric 22. Optionally, each of the antenna elements 12 can comprise a lens 26 that is arranged on the antenna-side end 13b.

All of the antenna elements 12 of the radar antenna 10 have the same polarisation direction 28. The polarisation direction 28 can indicate an orientation and/or direction of the electric field vector 28 of the fundamental mode in the waveguides 16.

Since the waveguides 16 shown in FIG. 6 are designed as circular waveguides 16, the electric field vector 28 can, in principle, be oriented in every direction transverse and/or orthogonal to a central axis and/or axis of symmetry of the waveguides 16.

Each of the antenna elements 12 comprises a radiator element 30 for coupling and/or decoupling the radar signal into or from the waveguides 16. The radiator elements 30 can be designed as, for example, conductive sheets, also referred to as patches and/or patch antenna elements 30, which can each be fed by means of a microstrip line that is coupled to a radar module and/or to a radar front end of the fill level measurement device 100. Each of the radiator elements 30 is arranged at least in part in the interior volume 22 of the associated waveguide 16. In particular, the radiator elements 30 can be arranged on the first end 13a of each waveguide 16.

In order for the polarisation directions 28 of the individual waveguides 16 to be oriented in parallel with one another, all of the radiator elements 30 have the same geometry and/or shape. Furthermore, all of the radiator elements 30 are oriented on the carrier plate 14 in an identical orientation and/or alignment relative to one another, and therefore the feed directions of the radiator elements 30 are identical to one another and the radar signals coupled into the waveguides 16 have electric field vectors 28 that are parallel to one another. In other words, the waveguides 16, for example at the radar front end thereof, are fed in the same manner and in the same orientation. Alternatively, the polarisation directions 28 of the individual antenna elements 12 can be antiparallel, i.e. rotated relative to one another by 180°. In general, the polarisation can be linear, circular or elliptical.

If the waveguides 16 are not designed as circular waveguides 16, but rather have a different cross section, an electric field vector of the fundamental mode of the waveguides 16 can have a particular direction and/or orientation.

A rectangular waveguide 16 comprises, for example, a narrow side and a wide side that is wider than the narrow side. In the case of a rectangular waveguide 16, the electric field vector of the fundamental mode is always oriented in parallel with the wide side. So that the polarisation directions 28 of the individual waveguides 16 are parallel to one another in this case, the waveguides 16 can be arranged on the carrier plate 14 in an identical orientation and/or alignment.

Figure 7:
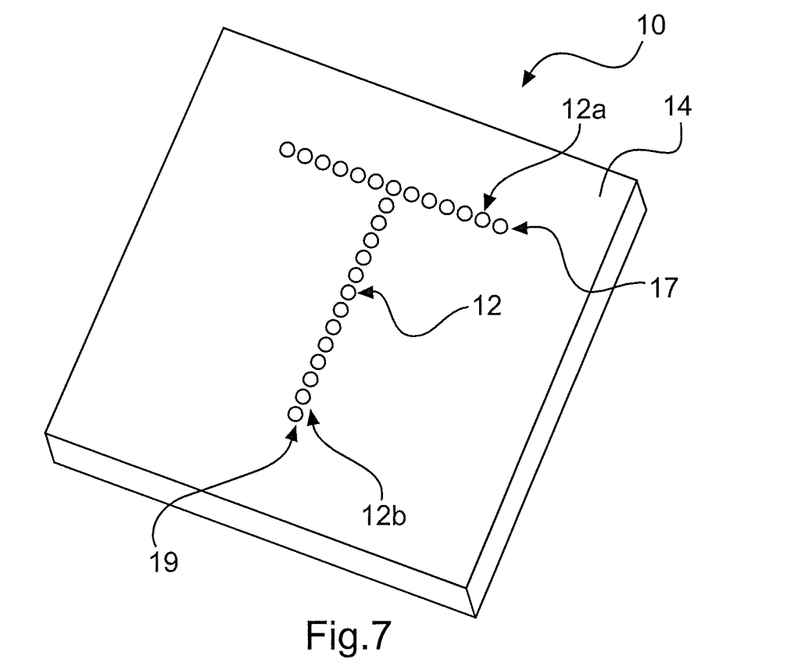
FIG. 7 shows a radar antenna according to one embodiment.

FIG. 7 shows a radar antenna 10 according to one embodiment. Unless indicated otherwise, the radar antenna 10 from FIG. 7 has the same elements and features as the radar antennas 10 from the previous figures.

Some of the antenna elements 12 are arranged on the carrier plate 14 one behind the other and/or one next to the other in a first row 17 and/or in a first direction 17, and some of the antenna elements 12 are arranged on the carrier plate 14 one behind the other and/or one next to the other in a second row 19 and/or in a second direction 19. In this figure, the first row 17 and/or the first direction 17 extends transversely, in particular orthogonally, to the second row 19 and/or to the second direction 19. In the embodiment shown in FIG. 7, the antenna elements 12 are arranged on the carrier plate 14 in a T-shaped arrangement.

The antenna elements 12 of the first row 17, which may be referred to as a first leg 17 of the T-shape, can be designed, for example, as transmitting elements 12a, and the antenna elements 12 of the second row 19, which may be referred to as a second leg 19 of the T-shape, can be designed as receiving elements 12b. Alternatively, the antenna elements 12 of the first row 17 can be designed as receiving elements 12b, and the antenna elements 12 of the second row can be designed as transmitting elements 12a. It is also possible for all of the antenna elements 12 to be designed as transmitting elements 12a and receiving elements 12b. In general, as a result of the T-shape arrangement, the radar antennas 10 and/or the fill level measurement device 100 can be made less complex, without there being losses in measurement accuracy.

The antenna elements 12 of the first row 17, which can be designed, for example, as transmitting elements 12a, can be successively activated, actuated and/or operated by time-division multiplexing by means of the control unit 101 of the fill level measurement device 100, for example. The signals reflected from the bulk material surface 107 can be received by the antenna elements 12 of the second row 19, which can be designed, for example, as receiving elements 12b. By suitably evaluating the obtained echo signals by means of the control unit 101 and/or an electronic system of the radar antenna 10 and/or of the fill level measurement device 100, a collection of echo curves can be identified that correspond exactly to the collection which is obtained by means of a virtual, rectangular arrangement of antenna elements 12. In other words, based on time-division multiplexing and/or suitable evaluation, the same measurement result can be achieved using the antenna elements 12 arranged in the shape of a T as can be achieved using a rectangular, virtual array of antenna elements 12. Since the antenna elements 12 of the virtual array each have a distance from one another that is less than or equal to one half of the wavelength of the radar signal used, unique digital and/or analogue beam formation can be carried out on the basis of these data, without the measurement accuracy being reduced by occurring grating lobes.

Figure 8A:
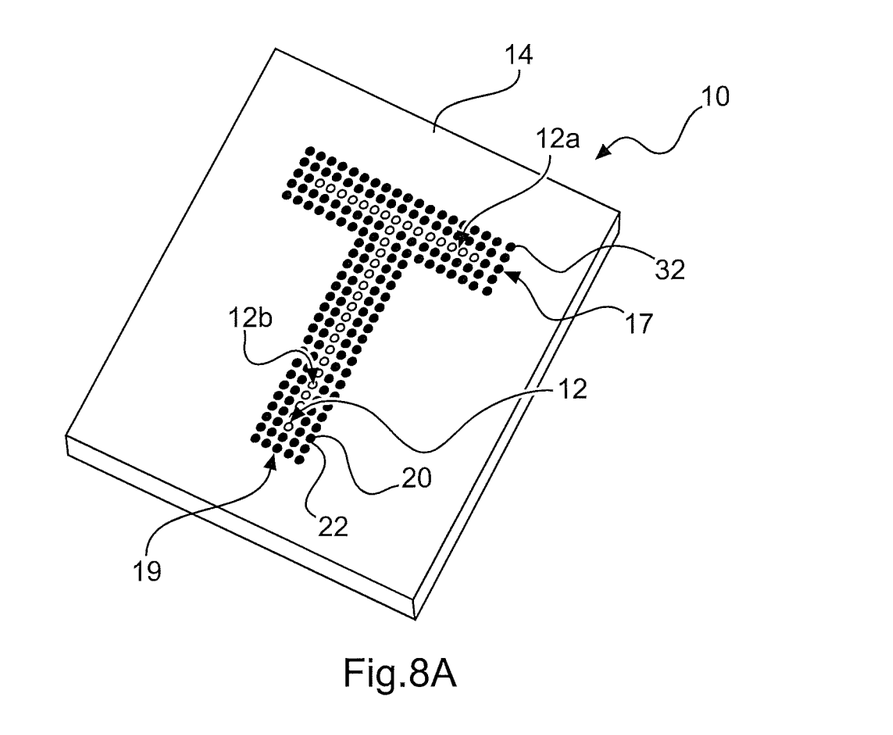
FIG. 8A shows a radar antenna according to one embodiment.

FIG. 8A shows a radar antenna 10 according to one embodiment. Unless indicated otherwise, the radar antenna 10 from FIG. 8A has the same elements and features as the radar antennas 10 from the previous figures.

The radar antenna 10 from FIG. 8A corresponds to the radar antenna 10 from FIG. 7, the antenna elements 12 arranged in the shape of a T also being surrounded by dummy antenna elements 32. In other words, the radar antenna 10 from FIG. 8A comprises a plurality of dummy antenna elements 32 which are also arranged on the carrier plate 14 and which are similar and/or identical to the antenna elements 12. The dummy antenna elements 32 therefore also comprise a waveguide 16, for example a dummy waveguide 16, the interior volume 20 of which is filled with a dielectric 22. The antenna elements 12 and the dummy antenna elements 32 are also arranged at a distance 18 from one another that is less than or equal to the wavelength of the radar signal, in particular less than or equal to one half of said wavelength. In FIG. 8A, the antenna elements 12, for example the transmitting elements 12a and/or the receiving elements 12b, are schematically shown as unfilled and/or white circles, whereas the dummy antenna elements 32 are shown as filled-in and/or black circles.

Unlike the antenna elements 12, however, the dummy antenna elements 32 are not designed to transmit and/or receive a radar signal, but rather the dummy waveguides 16 of the dummy antenna elements 32 are terminated with a terminating wave impedance, for example a 50 ohm terminating wave impedance, short-circuited or left open-circuit, such that a radar signal cannot be emitted by the dummy antenna elements 32.

The dummy antenna elements 32 are provided so as to influence the directional characteristics of the antenna elements 12, which can be advantageous for improved side lobe attenuation in the subsequent signal processing. By means of the dummy antenna elements 32, the directional characteristics of each individual antenna element 12 can be adapted to one another, such that they are almost identical and/or do not differ significantly from one another.

Figure 8B:
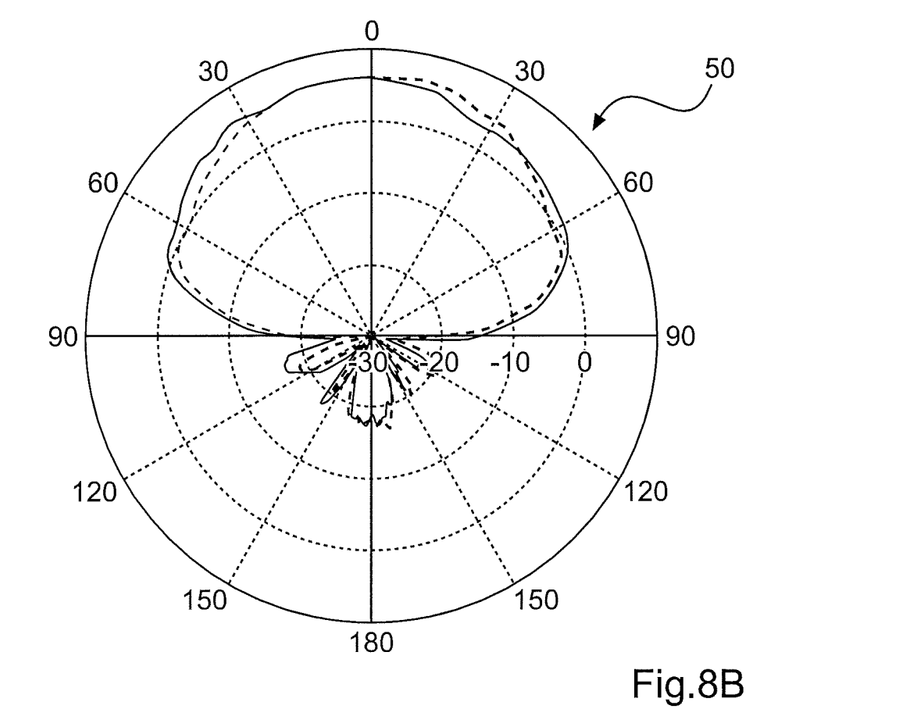
FIG. 8B is an antenna diagram not involving the use of dummy antenna elements.
Figure 8C:
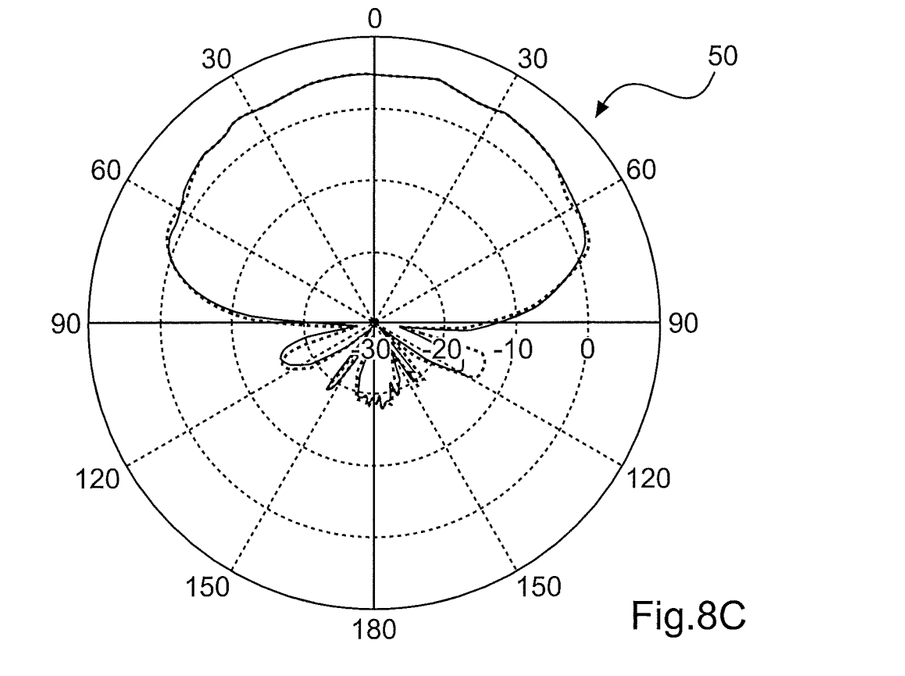
FIG. 8C is an antenna diagram involving the use of dummy antenna elements according to the embodiment from FIG. 8A.

The above-described effect of the dummy antenna elements 32 on the directional characteristic is shown in FIGS. 8B and 8C.

FIG. 8B is an antenna diagram 50 not involving the use of dummy antenna elements 32 for an antenna element 12 of a radar antenna 10, shown as a solid line, and a further antenna element 12, shown as a dashed line, the dashed line and the solid line each representing the directional characteristic of the corresponding antenna element 12. It can clearly be seen that the directional characteristics of the two antenna elements 12 differ significantly from one another in specific angular ranges.

By contrast with FIG. 8B, FIG. 8C is an antenna diagram 50 involving the use of dummy antenna elements 32 for an antenna element 12 of the radar antenna 10 from FIG. 8A, shown as a solid line, and a further antenna element 12 of the radar antenna 10 from FIG. 8A, shown as a dashed line, the dashed line and the solid line each representing the directional characteristic of the corresponding antenna element 12. A comparison of FIGS. 8B and 8C clearly shows that the directional characteristics of the two antenna elements 12 are brought more into line with one another and/or are matched to one another as a result of the arrangement of dummy antenna elements 32, and therefore the directional characteristics of the two antenna elements 12 are advantageously almost identical in a large part of the angular range.

Figure 9:
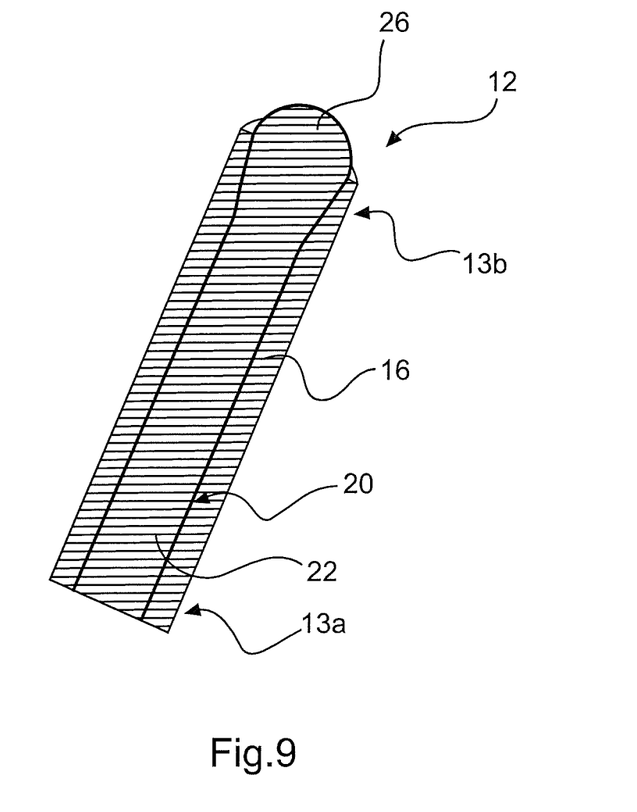
FIG. 9 shows an antenna element for a radar antenna, according to one embodiment.

FIG. 9 shows an antenna element 12 for a radar antenna 10 according to one embodiment. Unless indicated otherwise, the antenna element 12 from FIG. 9 has the same elements and features as the antenna elements 12 from the previous figures.

As can be seen from FIG. 9, the antenna element 12 is tapered at the antenna-side second end 13b, as a result of which an aperture can be advantageously enlarged. On account of the conical design, the attachment of a horn radiator can be formed, so to speak, which can increase the antenna gain.

Figure 10:
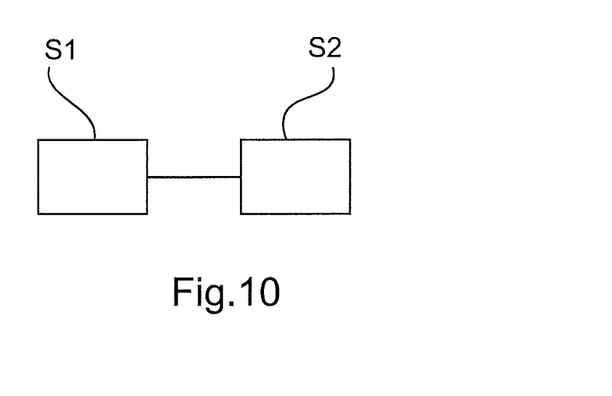
FIG. 10 is a flow chart illustrating steps of a method for producing a radar antenna according to one embodiment.

FIG. 10 is a flow chart illustrating steps of a method for producing a radar antenna 10 according to one embodiment.

In a first step S1, at least two antenna elements 12 for transmitting and/or receiving a radar signal are arranged on a carrier plate 14 of the radar antenna 10, each of the antenna elements 12 comprising a waveguide 16 for directing the radar signal. The antenna elements 12 are arranged at a distance from one another that is less than or equal to the wavelength of the radar signal, in particular less than or equal to one half of the wavelength.

In a further step S2, the interior volume 20 of each waveguide 16 is at least partially, in particular completely, filled with a dielectric 22.

For the sake of completeness, it should be noted that "comprising" and "having" do not exclude the possibility of other elements or steps, and "one", "a" or "an" does not exclude the possibility of a plurality. It should also be pointed out that features that have been described with reference to one of the above embodiments can also be used in combination with other features of other embodiments described above. Reference numerals in the claims should not be considered limiting.

I claim:

1. A radar antenna for a fill level measurement device, comprising:
    at least one carrier plate;
    at least two antenna elements that are arranged on the carrier plate and are configured to transmit and/or to receive a radar signal,
        wherein each of the antenna elements comprises a waveguide configured to direct the radar signal,
        wherein an interior volume of each waveguide is at least partially filled with a dielectric,
        wherein the antenna elements are arranged at a distance from one another that is less than or equal to a wavelength of the radar signal,
        wherein at least one of the at least two antenna elements is configured to only transmit a radar signal,
        wherein at least a further one of the at least two antenna elements is configured to only receive a radar signal, and
        wherein the waveguides of the antenna elements are oriented on the carrier plate such that the electric field vectors of the fundamental modes of the waveguides are oriented parallel or antiparallel to one another; and
    at least one dummy antenna element that is arranged on the at least one carrier plate and that is configured to positively influence a directional characteristic of at least one of the antenna elements, so that, for an improved side lobe attenuation, the at least one dummy antenna element comprises a dummy waveguide, which is terminated with a terminating wave impedance, short-circuited, or left open-circuit, such that a radar signal cannot be emitted by the at least one dummy antenna element.

2. The radar antenna according to claim 1, wherein the antenna elements have identical or antiparallel polarization directions.

3. The radar antenna according to claim 1,
wherein each of the antenna elements comprises a radiator element configured to couple the radar signal into the waveguide and/or to decouple the radar signal from the waveguide,
wherein each of the radiator elements is arranged at least in part in the interior volume of the associated waveguide and/or so as to adjoin a first end of said associated waveguide, and
wherein the radiator elements are designed and oriented relative to one another such that the radar signals coupled into the waveguides have electric field vectors that are parallel to one another.

4. The radar antenna according to claim 1,
wherein the dielectric has a relative permittivity of at least 1.5, and/or
wherein the dielectric comprises a synthetic fluoropolymer of tetrafluoroethylene, a plastics material, and/or polyether ether ketone.

5. The radar antenna according to claim 1,
wherein the dielectric has a relative permittivity of at least 1.9, and/or
wherein the dielectric comprises a synthetic fluoropolymer of tetrafluoroethylene, a plastics material, and/or polyether ether ketone.

6. The radar antenna according to claim 1,
wherein the waveguides are each formed as recess and/or opening in the carrier plate, or
wherein the waveguides are arranged on an outer surface of the carrier plate.

7. The radar antenna according to claim 1,
wherein each of the antenna elements comprises a lens arranged on an antenna-side end of the associated waveguide.

8. The radar antenna according to claim 7,
wherein the lenses of said each of the antenna elements are each formed in one piece with the dielectric.

9. The radar antenna according to claim 1,
wherein each of the waveguides is tapered at an antenna-side end so that an aperture in the antenna elements is enlarged.

10. The radar antenna according to claim 1,
wherein the antenna elements are arranged at a distance from one another that is less than or equal to one half of the wavelength of the radar signal.

11. The radar antenna according to claim 1,
wherein each of the waveguides has a circular, oval, elliptical, rectangular, square, or polygonal cross section.

12. The radar antenna according to claim 1,
wherein each of the waveguides has a circular cross section,
wherein each of the antenna elements is configured to transmit and/or receive a radar signal having a frequency of at least 75 GHz, and
wherein each of the waveguides has an inner diameter of less than 2.4 mm.

13. A fill level measurement device for determining a fill level of a medium, comprising:
at least one radar antenna according to claim 1.

14. The fill level measurement device according to claim 13,
wherein the radar antenna comprises a plurality of antenna elements that are designed as transmitting elements, are configured to transmit the radar signal, and are arranged on the carrier plate in a first row, and
wherein the radar antenna further comprises a plurality of antenna elements that are designed as receiving elements, are configured to receive a reflected signal, and are arranged on the carrier plate in a second row transversely to the first row.

15. A method for producing a radar antenna, the method comprising:
arranging at least two antenna elements for transmitting and/or receiving a radar signal on a carrier plate of the radar antenna, wherein each of the antenna elements comprises a waveguide for directing the radar signal;
at least partially filling an interior volume of each waveguide with a dielectric,
wherein the antenna elements are arranged at a distance from one another that is less than or equal to a wavelength of the radar signal,
wherein at least one of the at least two antenna elements is configured to only transmit a radar signal,
wherein at least a further one of the at least two antenna elements is configured to only receive a radar signal, and
wherein the waveguides of the antenna elements are oriented on the carrier plate such that the electric field vectors of the fundamental modes of the waveguides are oriented parallel or antiparallel to one another; and
arranging at least one dummy antenna element that on the carrier plate, wherein the dummy antenna element is configured to positively influence a directional characteristic of at least one of the antenna elements, so that, for an improved side lobe attenuation, the at least one dummy antenna element comprises a dummy waveguide, which is terminated with a terminating wave impedance, short-circuited, or left open-circuit, such that a radar signal cannot be emitted by the at least one dummy antenna element.

* * * * *